United States Patent
Hsu

[11] Patent Number: 5,984,245
[45] Date of Patent: Nov. 16, 1999

[54] DEVICE FOR ADJUSTING THE ANGLE AND HEIGHT OF AN ELECTRONIC ORGAN STAND

[76] Inventor: Hsin-Hsuan Hsu, 11 Kung-5th Rd., Kung-2nd Industrial Zone, Lin-Kou Hsiang, Taipei Hsein, Taiwan

[21] Appl. No.: 08/958,391

[22] Filed: Oct. 27, 1997

[51] Int. Cl.[6] ................................................. F16M 11/38
[52] U.S. Cl. ..................... 248/164; 248/166; 74/551.3; 74/527
[58] Field of Search ..................................... 248/166, 164, 248/431, 432, 163.1, 158; 84/376 A, 387 A, DIG. 3; 984/257, 344, DIG. 1; 38/103, 106, 137, 135, DIG. 1, DIG. 2, DIG. 3; 403/91, 92, 93; 74/551.1, 551.3, 527; 108/118, 119, 120

[56] References Cited

U.S. PATENT DOCUMENTS

| 4,763,865 | 8/1988 | Danner | 248/164 |
|---|---|---|---|
| 4,917,341 | 4/1990 | Pirchio | 248/164 |
| 5,358,204 | 10/1994 | Terada | 248/164 |
| 5,467,953 | 11/1995 | Malizia | 248/166 |
| 5,816,545 | 10/1998 | Malizia | 248/164 |
| 5,857,649 | 1/1999 | Eason | 248/164 |

FOREIGN PATENT DOCUMENTS

| 875352 | 9/1942 | France | 74/551.3 |
|---|---|---|---|

*Primary Examiner*—Leslie A. Braun
*Assistant Examiner*—Steven S. Wentsler
*Attorney, Agent, or Firm*—Bacon & Thomas

[57] ABSTRACT

A type of angle/height adjusting device for electronic organ stand, comprising a leg stand and a position adjusting device, the leg stand being composed of two tubes of I-shaped legs that are hinged in their middle parts to form an "X" configuration, so the cross rods on top of the leg stand will support an electronic organ; characterized in that: the position adjusting device is composed of a control rod, a spring and two positioning discs; the control rod is fitted inside the upright tube of one of the I-shaped legs, with a handle bar and a positioning block protruding out of the top part and lower part of the upright rod, and the spring is fitted between the top part of the control rod above the handle bar and the cross rod on the I-shaped leg, the two positioning discs are respectively fixed at the joint of the two I-shaped legs. Thus, the positioning block below the control rod will be accommodated in the vent on the positioning disc, to fix the two I-shaped legs; in order to adjust the angle and/or height of the entire stand, the handle bar is grasped to lift the control rod, so the positioning block is disengaged from the vent on the positioning disc, so the positioning block is accommodated in another vent on the positioning disc, thus the objective of adjusting the height of the leg stand can be accomplished.

1 Claim, 5 Drawing Sheets

DEVICE FOR ADJUSTING THE ANGLE AND HEIGHT OF AN ELECTRONIC ORGAN STAND

BACKGROUND OF THE INVENTION

The subject invention relates to an adjustable electronic organ stand, and particularly to one that enables easy, quick, convenient and comfortable adjustment of the angle and height of an electronic organ.

Conventionally, as illustrated in FIG. 5, a prior art electronic organ stand comprises mainly two I-shaped legs (a) and a fixing lever (b), wherein the two -shaped legs (a) are hinged at their middle parts to form an "X" configuration, and on the fixing lever (b) are a number of fixing holes (b1), one end of said fixing lever (b) is linked to the top of the upright rod (a1) of one of the I-shaped legs (a), on the top of the upright rod (a1) of another I-shaped leg is a bolt (c), one of the fixing holes (b1) on the fixing lever (b) may be screwed to said bolt (c), so the fixing lever (b) is fixed between the two I-shaped legs (a), to fix the two I-shaped legs (a). However, this conventional structure involves the disadvantage that the adjustment of the height of the two I-shaped legs is too slow and complicated, since the bolt (c) must be loosened before the fixing lever (b) is removed, and another fixing hole (b1) and the bolt (c) on the fixing lever (b) are tightened, thus resulting in more complicated adjustment procedures that are slow to accomplish.

In view of this disadvantage, the subject inventor has spend an extended period of time in the research and innovation, and has finally developed and designed an improved type of "angle and/or height adjusting device for electronic organ stand".

SUMMARY OF THE INVENTION

The primary objective of the subject invention is to provide a device that enables easy, quick, convenient and comfortable procedures in the adjustment of the height of an electronic organ stand.

Another objective of the subject invention is to provide an adjustable electronic organ stand that ensures stability and safety.

To achieve said objectives, the main structure of the subject invention is composed of a leg stand and a position adjusting device, the leg stand comprising two tubes of I-shaped legs that are hinged at their middle parts to form an "X" configuration, with the cross rods on top of the leg stand serving to support an electronic organ; characterized in that: the position adjusting device is composed of a control rod, a spring and two positioning discs; the control rod is fitted inside the upright tube of one I-shaped leg, on its top and lower parts are respectively a handle bar and a positioning block that protrude out of the upright rods, and a spring is fitted between the top of the control rod on top of the handle bar and the cross rod of the I-shaped leg, the two positioning discs are respectively fixed at the joint of the two I-shaped legs, on the rim of said positioning discs are vents, said vents correspond to the positioning block below the control rod. Thus, the positioning block below the control rod is accommodated in the vent on the positioning disc, to fix the two I-shaped legs in position; in order to adjust the angle and/or height of the leg stand, the handle bar is held to lift the control rod, to disengage the positioning block from the vent on the positioning disc, then, the positioning block is accommodated in another vent on the positioning disc, so the objective of adjusting the height of the leg stand can be accomplished.

To enable better understanding of the entire configuration, mechanism, characteristics and performance of the subject invention, the embodiment of the subject invention and drawings are described in detail as follows:

DETAILED DESCRIPTION OF THE PREFERRED EMBODIMENT

Figure 1:
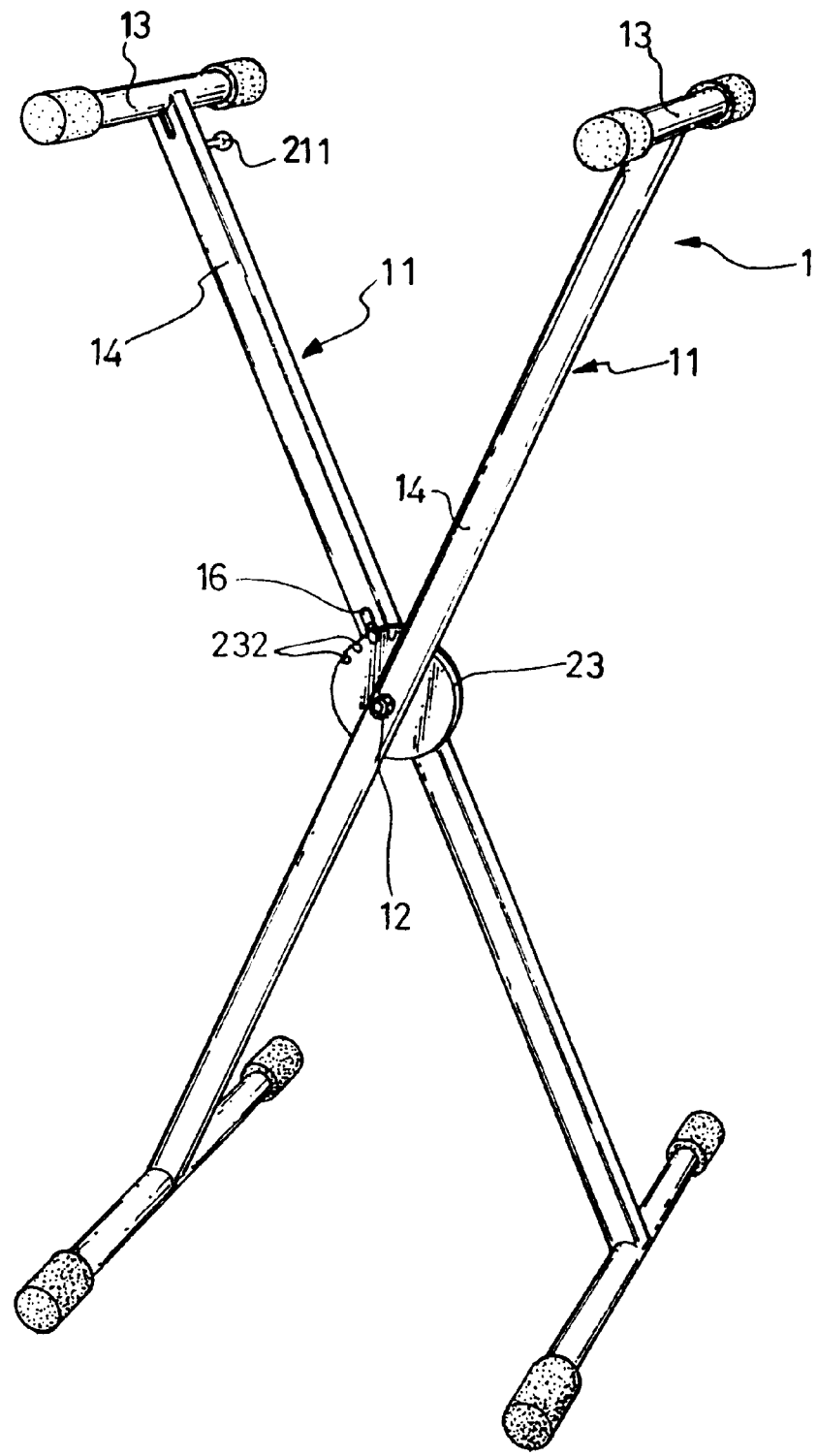
FIG. 1 is a perspective view of the subject invention.
Figure 2:
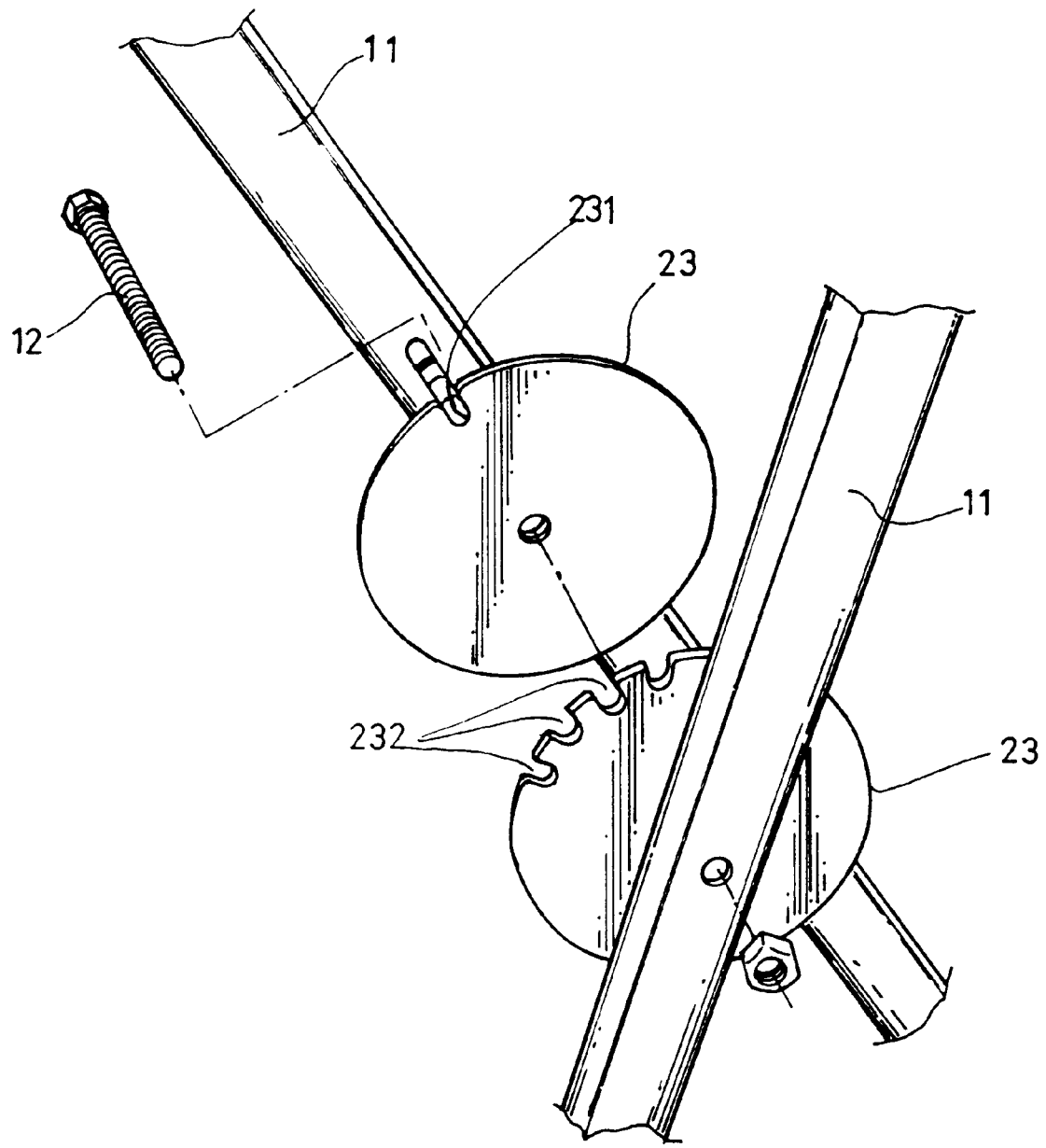
FIG. 2 is a partially exploded view of the subject invention.
Figure 3:
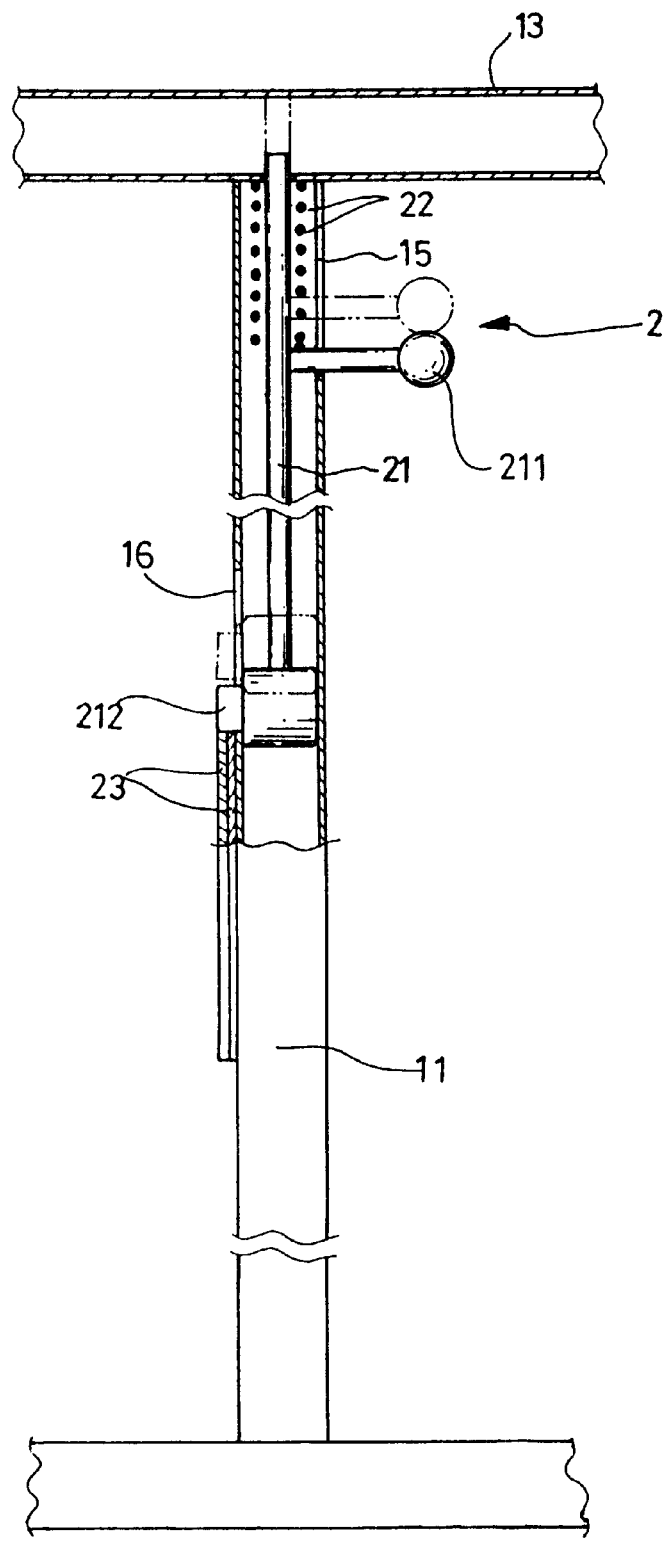
FIG. 3 is an illustration of the control rod in the subject invention, when it is being lifted.
Figure 4:
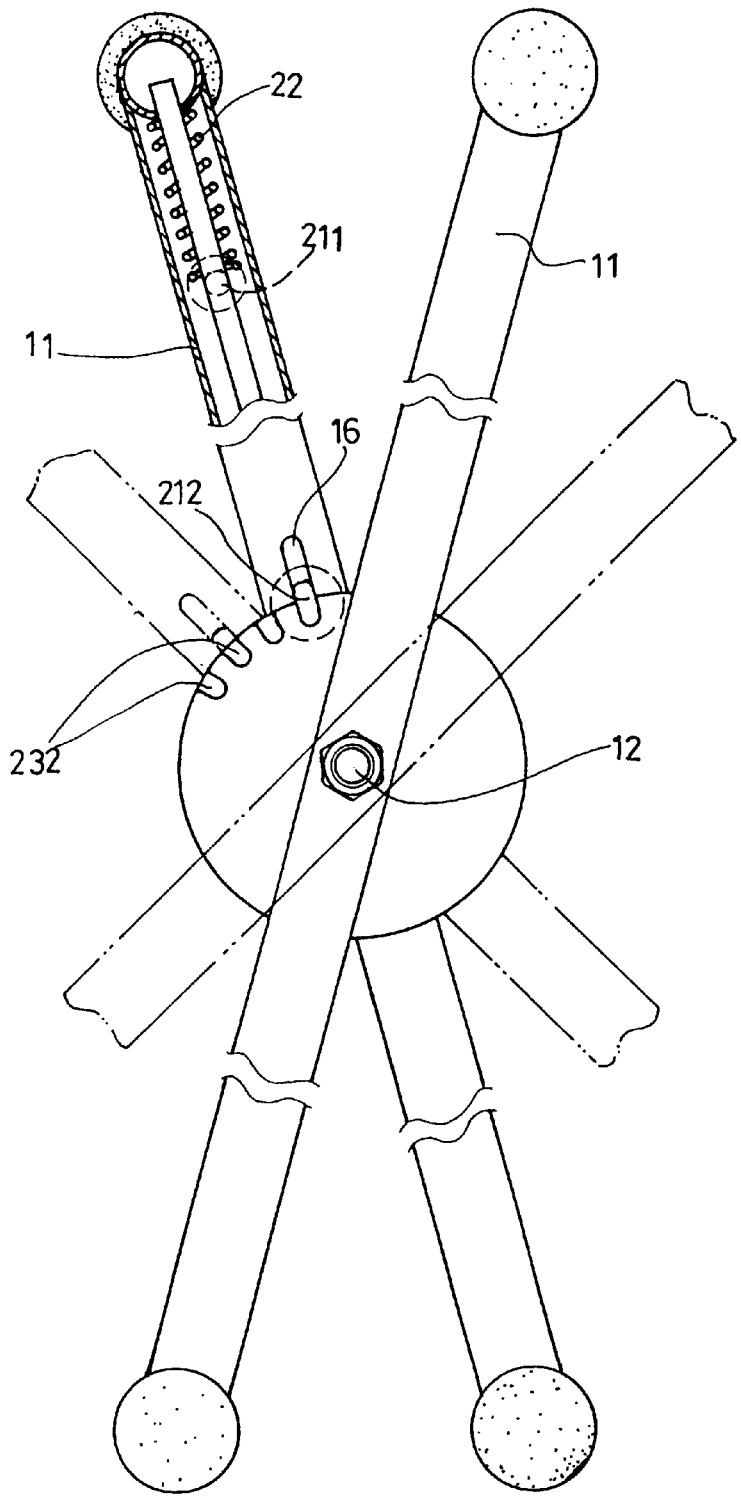
FIG. 4 is an illustration of the I-shaped legs in the subject invention, when they are turned to adjust the angle.
Figure 5:
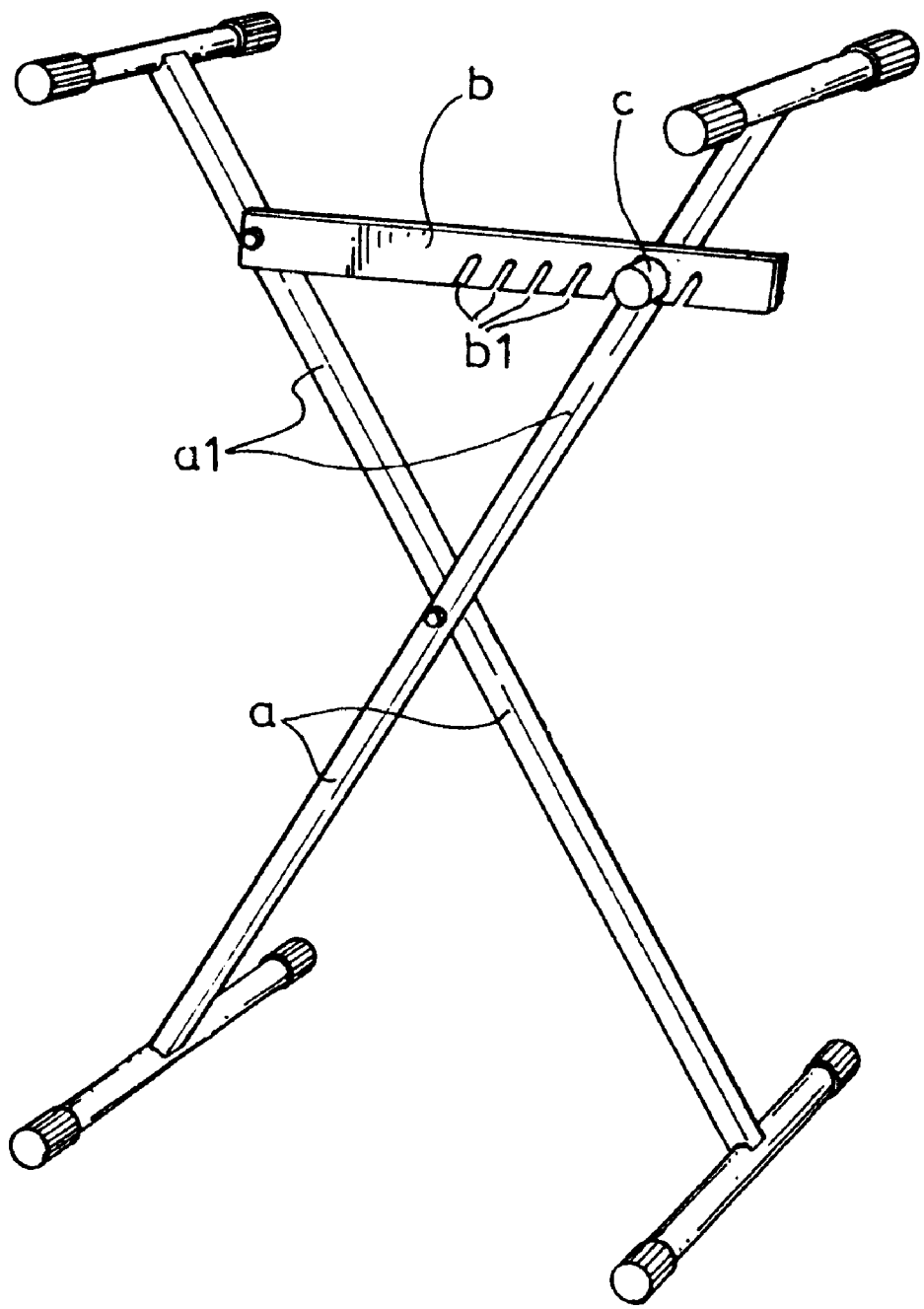
FIG. 5 is a perspective view of a prior art.

Please refer to FIGS. 1 through 4, the invention comprises leg stand 1 and a position adjusting device, said leg stand 1 includes two I-shaped legs 11 that are made of a tube material, said I-shaped legs are hinged in their middle parts by a shaft rod 12 to compose an X-shaped configuration, so designed that the cross rods 13 on top of the I-shaped legs 11 will support an electronic organ;

The subject invention is characterized in that: the position adjusting device 2 comprises a control rod 21, a spring 22 and two positioning discs 23, wherein, on top of the control rod 21 and protruding from one side is a handle bar 211, below said control rod 21 and protruding from one side is a positioning block 212. There is an elongated hole 15 on the outside near the cross rod 13 on top of the upright rod 14 of one of the I-shaped legs 11 of said leg stand 1, there is another elongated hole 16 near the middle shaft rod 12 on the opposite side, while the control rod 21 is located inside the upright rod 14 of the I-shaped leg 11, so that the handle bar 211 on it and the positioning block 212 are respectively protruding outside the elongated hole 15 on top of the upright rod 14 and the elongated hole 16 near the middle shaft rod 12, and the spring 22 is mounted between the top of the control rod 21 on top of the handle bar 211 and the cross rod 13 of the I-shaped leg 11, besides, the centers of said two positioning discs 23 are penetrated by said shaft rod 12, wherein, on the rim of the positioning disc 23 of the I-shaped leg 11 with the control rod 21 is a notch 231, said notch 231 corresponds to the positioning block 212 below the control rod 21, and, on the rim of the positioning disc 23 on another I-shaped leg 11 are also a plurality of equally spaced notches 232, thus, when the I-shaped legs 11 are rotated, said notches 232 may selectively align with notch 231 on the positioning disc 23 with the control rod 21;

According to said construction, the positioning block 212 below the control rod 21 may be positioned in the aligned notches 231,232 on the two positioning discs 23, to fix the two I-shaped legs 11 in position; thus to adjust the angle and/or height of the two I-shaped legs 11, the handle bar 211 on the control rod 21 may be grasped to lift the control rod 21, so the positioning block 212 on the control rod 21 is disengaged from the aligned notches 231,232 on the two positioning discs 23, to enable rotation of the two I-shaped legs 11, then the positioning block 212 is again engaged in the notch 231 on the positioning disc 23 on the I-shaped leg 11 with the control rod 21 and in the notch 232 on the positioning disc 23 on another I-shaped leg, to perform the adjustment of the angle and height of the two I-shaped legs 11.

As described above, in the process of adjusting the angle and height of the two I-shaped legs 11 of the subject invention, only the control rod 21 and the positioning disc 23 are used to adjust the angle and height of the leg stand 1, moreover, the adjusting process is indeed quite easy, quick, comfortable and convenient; besides, the positioning block 212 on the control rod 21 of the position adjusting device 2 of the subject invention may be engaged in the notches 231,232 in the peripheries of the two positioning discs 23, to fix the two I-shaped legs 11 in a secure position, furthermore, on top of the control rod 21 is the elasticity of the spring 22 to depress the control rod 21, so the positioning block 212 may be securely accommodated in the notches 231,232 on the two positioning discs 23, so that the positioning block 212 will not jump out of the notches 231,232 when it is subject to vibration or impact.

Summing up, the subject invention, an unprecedented new version that has never been disclosed in any publications before, will fully satisfy the qualifications for a patent right.

It is declared hereby that the above description, covering only the preferred embodiment of the subject invention, should not be based to limit or restrict the subject claim, and that all equivalent structural and/or configurational variations and/or modifications deriving from the subject description with drawings herein shall reasonably be included in the subject claim.

I claim:

1. An electronic organ stand formed from a pair of tubular legs pivotally secured together by a shaft rod to define an X-shaped configuration, the legs having a pair of top ends provided with two cross rods for supporting the organ, and a device for adjusting the height and angle of the stand, the device comprising:

a) a control rod disposed within a portion of a first leg, the control rod being positioned between the top end of the first leg and the shaft rod, the control rod including an upper end provided with a handle, a lower end provided with a positioning block, and a spring disposed within the first leg for biasing the control rod, the positioning block and the handle towards the shaft rod;

b) a first elongated hole formed in the first leg adjacent the top end thereof, the handle of the control rod extending outwardly of the first elongated hole for movement along the length thereof;

c) a second elongated hole formed in the first leg adjacent the shaft rod, the positioning block extending outwardly of the second elongated hole for movement along the length thereof;

d) a first positioning disc secured to the first leg and the shaft rod extending through a center of the first positioning disc, the first positioning disc including a first notch formed in a periphery thereof;

e) a second positioning disc secured to the second leg and the shaft rod extending through a center of the second positioning disc, the second positioning disc including a plurality of spaced second notches formed in a periphery thereof; and f) the second notches being selectively alignable with the first notch when the handle is pulled in a direction away from the shaft rod against the spring bias and the legs are pivoted about the shaft rod, and whereby release of the handle causes the control rod to move under the spring bias in a direction towards the shaft rod for engaging the positioning block within a selected pair of aligned first and second notches to secure the legs in a desired position of adjustment.

* * * * *